(12) United States Patent
Ramalingam et al.

(10) Patent No.: US 8,224,071 B2
(45) Date of Patent: Jul. 17, 2012

(54) METHOD FOR REGISTERING 3D POINTS WITH 3D PLANES

(75) Inventors: Srikumar Ramalingam, Cambridge, MA (US); Yuichi Taguchi, Cambridge, MA (US)

(73) Assignee: Mitsubishi Electric Research Laboratories, Inc., Cambridge, MA (US)

(*) Notice: Subject to any disclaimer, the term of this patent is extended or adjusted under 35 U.S.C. 154(b) by 187 days.

(21) Appl. No.: 12/824,329

(22) Filed: Jun. 28, 2010

(65) Prior Publication Data

US 2011/0060556 A1    Mar. 10, 2011

Related U.S. Application Data

(63) Continuation-in-part of application No. 12/495,655, filed on Jun. 30, 2009.

(51) Int. Cl.
*G06K 9/00* (2006.01)
(52) U.S. Cl. ........................................ 382/154
(58) Field of Classification Search .......... 382/103, 382/154, 295; 600/424; 345/156
See application file for complete search history.

(56) References Cited

U.S. PATENT DOCUMENTS

| 5,923,791 | A  | * | 7/1999  | Hanna et al. | 382/295 |
| 6,173,066 | B1 | * | 1/2001  | Peurach et al. | 382/103 |
| 7,613,323 | B2 | * | 11/2009 | Nister et al. | 382/103 |
| 8,121,399 | B2 | * | 2/2012  | Hayashi et al. | 382/154 |

* cited by examiner

*Primary Examiner* — Claire X Wang
(74) *Attorney, Agent, or Firm* — Dirk Brinkman; Gene Vinokur

(57) ABSTRACT

Three-dimensional points acquired of an object in a sensor coordinate system are registered with planes modeling the object in a world coordinate system by determining correspondences between the points and the planes. Points are transformed to an intermediate coordinate system using the correspondences and transformation parameters. The planes are transformed to an intermediate world coordinate system using world rotation and translation parameters. Intermediate rotation and translation parameters are determined by applying coplanarity constraints and orthogonality constraints to the points in the intermediate sensor coordinate system and the planes in the intermediate world coordinate system. Then, rotation and translation parameters between the sensor and world coordinate systems are determined to register the points with the planes.

5 Claims, 6 Drawing Sheets

METHOD FOR REGISTERING 3D POINTS WITH 3D PLANES

RELATED APPLICATIONS

This is a continuation-in-part of U.S. application Ser. No. 12/495,655, "Method for Determining a Location From Images Acquired of an Environment with an Omni-Directional Camera," filed Jun. 30, 2009, by Ramalingam et al., incorporated herein by reference. This application is also related to MERL-2250 U.S. application Ser. No. 12/824,296 filed Jun. 28, 2010, by Ramalingam et al., entitled "Method and System for Localizing in Urban Environments from Omni-Direction Skyline Images," and MERL-2252 Application 12/824,828 filed Jun. 28, 2010, by Ramalingam et al., entitled "Method for Determining 3D Poses Using Points and Lines," co-filed herewith.

FIELD OF THE INVENTION

This invention relates generally to three dimensional registration, and more particularly to registering 3D points with 3D planes.

BACKGROUND OF THE INVENTION

Three-dimensional point to three-dimensional plane (3D-3D) registration is fundamental to computer vision, robotics, object recognition and tracking, image registration, and augmented reality.

The registration problem includes a correspondence problem and a pose estimation problem using the correspondence. Both of these problems are intertwined, and the solution of one depends on the other. As used herein in, the pose is defined by 3D translation and 3D rotation.

Many 3D-3D registration methods are known depending on the representation of the two 3D datasets: 3D points to 3D points, 3D lines to 3D planes, and 3D points to 3D planes. The most common method registers two sets of 3D points. Although approaches such as iterative closest point and its variants exist for this problem, only a few non-iterative methods are known. Other applications involve the registration of 3D lines or points with normals to 3D planes.

Many conventional methods assume that the correspondences are known. Several registration methods focus on solving both the correspondences and pose estimation by casting the correspondence problem as a graph theoretical problem. This is an NP-hard problem, such as a minimum vertex cover, and a maximum clique. Several solutions are known to solve these NP-hard problems using branch and bound techniques.

SUMMARY OF THE INVENTION

The embodiments of the invention provide a method for registering 3D points obtained from a 3D sensor to 3D planes of an object. The embodiments provide a class of minimal solutions for point to plane registration, and a pose estimation method for several configurations that arise from the distribution of points on planes. To determine the six degrees-of-freedom pose between the sensor and the object, the method uses at least six points on three or more planes. The method operates without explicit assumptions about the nature of the sensor.

DETAILED DESCRIPTION OF THE PREFERRED EMBODIMENTS

Figure 1:
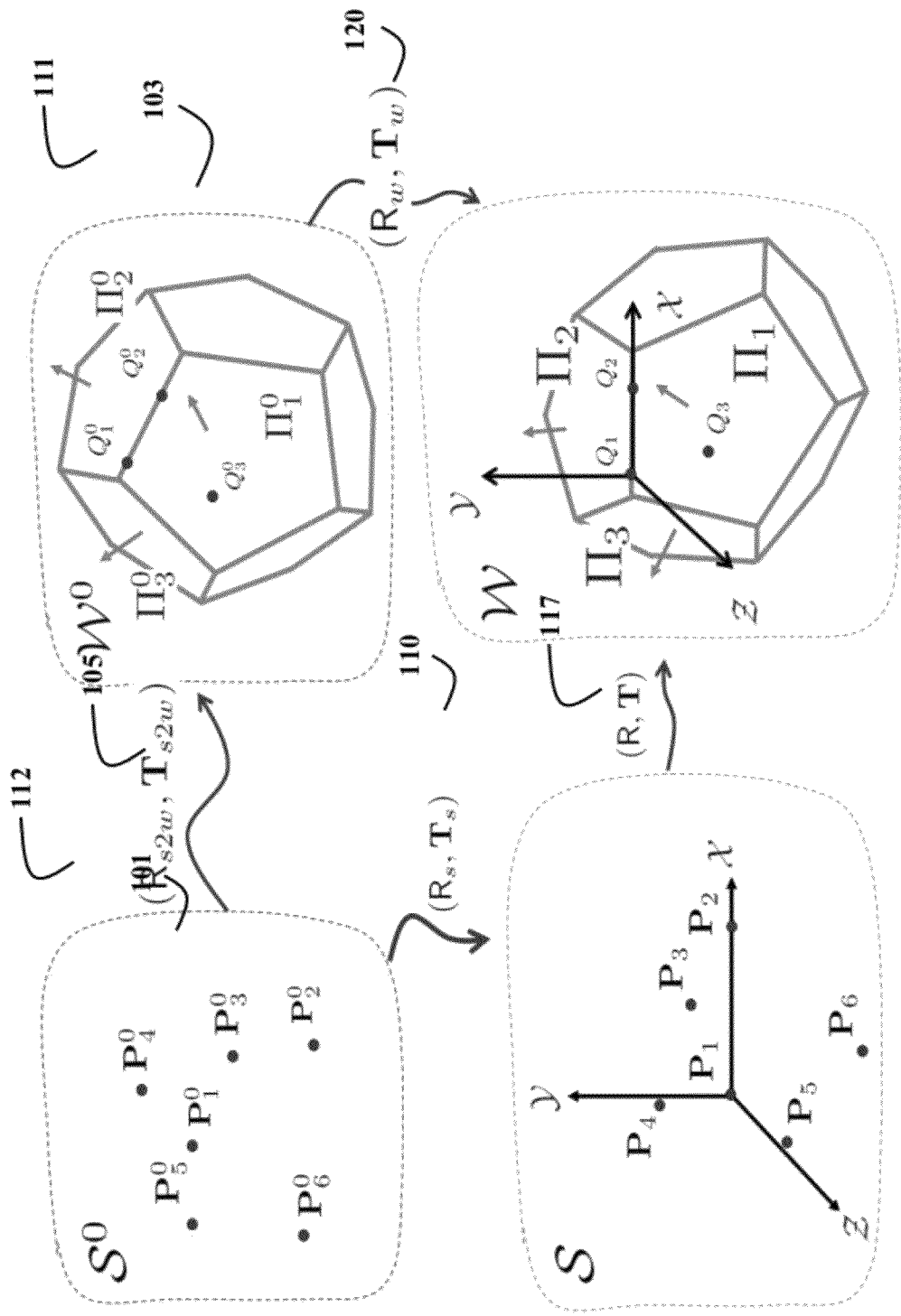
FIG. 1 is a schematic of a method for registering 3D points with 3D planes according to embodiments of the invention.
Figure 2:
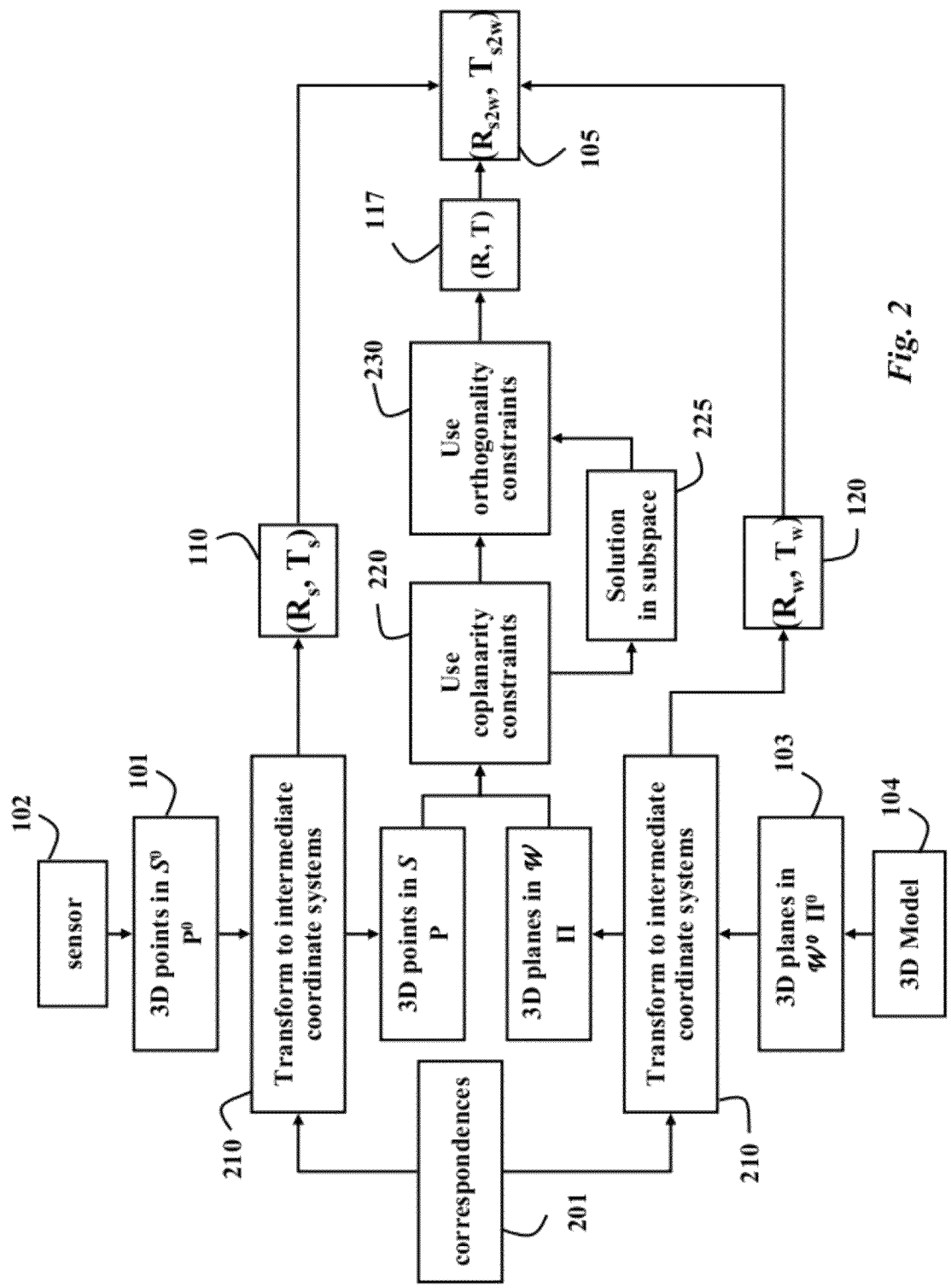
FIG. 2 is a flow diagram of the method for registering 3D points with 3D planes according to embodiments of the invention.

As shown graphically in FIG. 1 and procedurally in FIG. 2, the embodiments of our invention provide a method for registering 3D points $P^O$ 101 with 3D planes $\Pi^O$ 103. The points and planes are associated with an object. The points can be acquired by a sensor 102, such as a laser scanner—see FIG. 2. The planes can be determined from an accurate 3D model 104 of the object. The steps of the method can be performed in a processor including memory and input/output interfaces as known in the art.

Our goal is to determine the location and orientation of the sensor points with respect to the single, possibly non-convex, polyhedral object. The planes in the object are represented in a world coordinate system ($W^0$) 111, and the sensor points is represented in a sensor coordinate system ($S^O$) 112.

The sensor 102 acquires N 3D points $P^O_1, \ldots, P^O_N$ of 3D surfaces of the object. The model 104 provides M planes $\Pi^O_1, \ldots, \Pi^O_M$ of the object.

We partition the registration problem into two problems. We determine the correspondences between the 3D points from the sensor and the 3D planes of the 3D object. From the correspondences between the 3D points and the planes of the 3D object, we determine a rotation and a translation parameters $(R_{s2w}, T_{s2w})$ 105 between the sensor coordinate system and the world coordinate system to register the points with the planes. We first describe the pose determination, and then the correspondence determination.

Pose Determination

The pose determination uses the correspondences between the 3D points and the planes. The correspondences are determined as described below. We systematically describe different configurations where we know the distribution of the points on the planes and provide a pose determination method for each configuration.

We denote the configurations as Points($a_1, a_2, \ldots, a_n$)-Planes(n) where n={3, 4, 5, 6} refers to the number of distinct planes and $a_i$ refers to the number of points in $i^{th}$ plane.

The correspondence between a single point and a plane yields a single coplanarity equation. Because there are six unknown degrees of freedom in $(R_{s2w}, T_{s2w})$, we need at least six point-plane correspondences to determine the pose. In a degenerate configuration, six correspondences may not be sufficient, depending on the distribution of the points on the planes. Although the embodiments for different configurations are slightly different, their underlying approach is the same. Here we describe a configuration of Points(3, 2, 1)-Planes(3), but all configurations use the steps as shown in FIGS. 1 and 2.

We transform the points in the sensor coordinate system $S^O$ to an intermediate sensor coordinate system S using sensor rotation and translation parameters $(R_s, T_s)$ 110, such that three points ($P_1$, $P_2$, $P_3$) are respectively at an origin, at an X axis and in an XY plane of the intermediate sensor coordinate system. The planes in the world coordinate system $\mathcal{W}^0$ of the object are transformed to an intermediate world coordinate system W using world rotation and translation parameters ($R_w$, $T_w$) 120, such that the plane $\Pi_1$ is in the XY plane, and a plane $\Pi_2$ intersects the X axis of the intermediate world coordinate system;

As shown in FIG. 2, we transform 210 the sensor coordinate system and the world coordinate systems to corresponding intermediate sensor and world coordinate systems to reduce a degree of resulting polynomial equations, and a decrease in the number of degrees of freedom in the pose between the sensor and object. Then, the rotation and the translation (R, T) 117 can be expressed using fewer variables. The correspondences 201 between the points and planes provide a set of coplanarity constraints 220. Using a linear system specified by the coplanarity constraints, we express the unknown pose variables in a subspace 225 spanned by one or more vectors. Then, we use an appropriate number of orthonormal constraints 230 from a rotation matrix to determine solutions for the pose variables (R, T) 117.

Coordinate Systems

As shown in FIG. 1, the sensor coordinate system 112 and the world coordinate system 111 for the points and planes are denoted by $S^0$ and $\mathcal{W}^0$ respectively. We determine the transformation ($R_{s2w}$, $T_{s2w}$) 105, which expresses the 3D points in the world coordinate system of the object. A straight-forward application of coplanarity constraints results in six linear equations involving twelve variables, i.e., 9 $R_{ij}$, and 3 $T_i$.

We need at least six additional equations to solve for these variables. The equations can be six quadratic orthogonality constraints. The solution of such a system eventually results in a 64th ($2^6$) degree polynomial equation. This equation has 64 solutions, and the determination of such solutions may not be feasible for several applications.

We overcome this difficulty by first transforming points and the planes from the sensor and the world coordinate systems to corresponding intermediate sensor and world coordinate systems S and W, respectively. After this transformation, our goal is to find the pose (R, T) between these intermediate coordinate systems. We select the intermediate coordinate systems S and W such that the resulting polynomial equation is of a lowest possible degree. Such a transformation is always possible using a constructive argument. Although a transformation of this type is applicable to many problems, the automation of such an algorithm is an $L_0$ norm minimization problem. Hence, we provide explicit transformation parameters for the point-plane registration problem only.

Transformation From $S^0$ to S

As shown in FIG. 1, we denote the points in $S^0$ using $P^0_i$ and the points in S using $P_i$. We define the transformation 110 as the one that results in $P_i$ satisfying the following conditions:

a. $P_1$ is at the origin;
b. $P_2$ is along a positive X axis; and
c. $P_3$ is on the XY plane.

The required transformation ($R_s$, $T_s$) 110 is the one that moves the points ($P^0_1$, $P^0_1$, $P^0_2$, $P^0_3$). The $P^0_i$ are already given in the problem statement, and the transformed points $P_i$ can be determined using the above conditions.

Transformation from $W^O$ to w

As shown in FIG. 1, we denote the planes in $W^0$ and W using $\Pi^0_i$ and $\Pi_i$, respectively. We define the transformation 120 as the one that results in $\Pi_i$ satisfying the following conditions:

a. $\Pi_1$ lies on the XY plane; and
b. $\Pi_2$ passes through the X-axis.

We assume that $Q^0_1$ and $Q^0_2$ are two points on a line of intersection of the two planes $\Pi^0_1$ and $\Pi^0_2$. Let $Q^0_3$ be any other point on the plane $\Pi^0_1$. Let $Q_1$, $Q_2$ and $Q_3$ be the 3D points after the transformation to the intermediate world coordinate system W. The transformation ($R_w$, $T_w$) 120 moves the triplet ($Q^0_1$, $Q^0_2$, $Q^0_3$) to ($Q_1$, $Q_2$, $Q_3$). Note that the $Q^0_i$ can be determined from $\Pi^0_i$, and the transformed points $Q_i$ can be determined in the same way as the points $P_i$.

For brevity, we denote the 3D points as $$P_1 = \begin{pmatrix} 0 \\ 0 \\ 0 \end{pmatrix}, P_2 = \begin{pmatrix} X_2 \\ 0 \\ 0 \end{pmatrix}, P_3 = \begin{pmatrix} X_3 \\ Y_3 \\ 0 \end{pmatrix}, \text{ and} \quad (1)$$

$$P_i = \begin{pmatrix} X_i \\ Y_i \\ Z_i \end{pmatrix}, i = \{4, 5, 6\} \quad (2)$$

The equations of the planes after the transformation are $$Z=0 \Rightarrow \Pi_1 \quad (3)$$

$$B_2 Y + C_2 Z = 0 \Rightarrow \Pi_2 \quad (4)$$

$$A_3 X + B_3 Y + C_3 Z + D_3 = 0 \Rightarrow \Pi_3 \quad (5)$$

$$A_4 X + B_4 Y + C_4 Z + D_4 = 0 \Rightarrow \Pi_4 \quad (6)$$

$$A_5 X + B_5 Y + C_5 Z + D_5 = 0 \Rightarrow \Pi_5 \quad (7)$$

$$A_6 X + B_6 Y + C_6 Z + D_6 = 0 \Rightarrow \Pi_6 \quad (8)$$

where $A_i$, $B_i$, $C_i$, and $D_i$ are the parameters of the planes defining the orientation and location of each planes.

In the configuration of Points(3, 2, 1)-Planes(3), the correspondences between the points and the planes are $\Pi_1 \Leftarrow \{P_1, P_2, P_3\}$ $\Pi_2 \Leftarrow \{P_4, P_5\}$ $\Pi_3 \Leftarrow \{P_6\}$.

As a result of these correspondences, the plane corresponding to the three points and the plane are mapped to the XY plane. Consequently, the rotation (R) and translation (T) between the sensor points and object planes preserves the points on the same XY plane. In other words, the rotation is only along the Z axis, and the translation only in the XY plane. There are two pairs of rotation and translation that satisfy this constraint $$R_1 = \begin{pmatrix} R_{11} & R_{12} & 0 \\ -R_{12} & R_{11} & 0 \\ 0 & 0 & 1 \end{pmatrix}, T_1 = \begin{pmatrix} T_1 \\ T_2 \\ 0 \end{pmatrix}, \text{ and} \quad (9)$$

$$R_2 = \begin{pmatrix} R_{11} & R_{12} & 0 \\ R_{12} & -R_{11} & 0 \\ 0 & 0 & -1 \end{pmatrix}, T_2 = \begin{pmatrix} T_1 \\ T_2 \\ 0 \end{pmatrix}. \quad (10)$$

Hence, there is a reduction in the number of degrees of freedom in the required pose between the intermediate coordinate systems. To minimize the number of degrees of freedom, we separately formulate $R_1$ and $R_2$, whose relation is the reflection with the Z=0 plane.

Coplanarity Constraints

We know that the points $P_4$ and $P_5$ are on the plane $\Pi_2$, see Eqn. (4). This implies that these points have to satisfy the following coplanarity constraints $$B_2(-R_{12}X_4+R_{11}Y_4+T_2)+C_2Z_4=0$$

$$B_2(-R_{12}X_5+R_{11}Y_5+T_2)+C_2Z_5=0.$$

Similarly, the constraint from the third plane $\Pi_3$ is $$A_3(R_{11}X_6+R_{12}Y_6+T_1)+B_3(-R_{12}X_6+R_{11}Y_6+T_2)+C_3Z_6+D_3=0.$$

Using the above coplanarity constraints for the two planes $\Pi_2$ and $\Pi_3$, we construct the following linear system $$\mathcal{A}\begin{pmatrix} R_{11} \\ R_{12} \\ T_1 \\ T_2 \end{pmatrix} = \begin{pmatrix} -C_2Z_4 \\ -C_2Z_5 \\ -C_3Z_6-D_3 \end{pmatrix}, \quad (11)$$

where $\mathcal{A}$ is $$\mathcal{A} = \begin{pmatrix} B_2Y_4 & -B_2X_4 & 0 & B_2 \\ B_2Y_5 & -B_2X_5 & 0 & B_2 \\ A_3X_6+B_3Y_6 & A_3Y_6-B_3X_6 & A_3 & B_3 \end{pmatrix}. \quad (12)$$

The matrix $\mathcal{A}$ has known variables and rank 3. Because there are four variables in the linear system, we can obtain their solution in a subspace spanned by one vector $$\begin{pmatrix} R_{11} \\ R_{12} \\ T_1 \\ T_2 \end{pmatrix} = \begin{pmatrix} u_1 \\ u_2 \\ u_3 \\ u_4 \end{pmatrix} + l_1 \begin{pmatrix} v_1 \\ v_2 \\ v_3 \\ v_4 \end{pmatrix}, \quad (13)$$

where $u_i$, $v_i$ are known, and $l_1$ is the only unknown variable.

Orthogonality Constraints

We can resolve the unknown variable $l_1$ using a single orthogonality constraint $$R_{11}^2+R_{12}^2+R_{13}^2=1$$

$$(u_1+l_1v_1)^2+(u_2+l_1v_2)^2 = 1.$$

By solving the above equation, we obtain two different solutions for $l_1$ and obtain two solutions for the overall pose $(R_1, T_1)$. Because we can similarly determine two solutions for $(R_2, T_2)$, we have four solutions.

Using the solutions for $(R,T)$, we determine the pose between the sensor and world coordinate systems as $$\begin{pmatrix} R_{s2w} & T_{s2w} \\ 0 & 1 \end{pmatrix} = \begin{pmatrix} R_w & T_w \\ 0 & 1 \end{pmatrix}^{-1} \begin{pmatrix} R & T \\ 0 & 1 \end{pmatrix} \begin{pmatrix} R_s & T_s \\ 0 & 1 \end{pmatrix}.$$

Other Configurations

The Appendix shows other configurations solved by the registration method, where the distribution of points and the number of planes differ. In these configurations, we may have more unknown variables in the intermediate rotation and translation (R, T). In that case, we use additional orthogonality constraints for the rotation variables, resulting in an increase of the number of solutions.

Special Configuration

If the points lie on the boundaries of the planes, i.e., every point lies on two planes, then three points are sufficient to determine the pose.

A Generic Concept for Pose Estimation

Figure 5A:
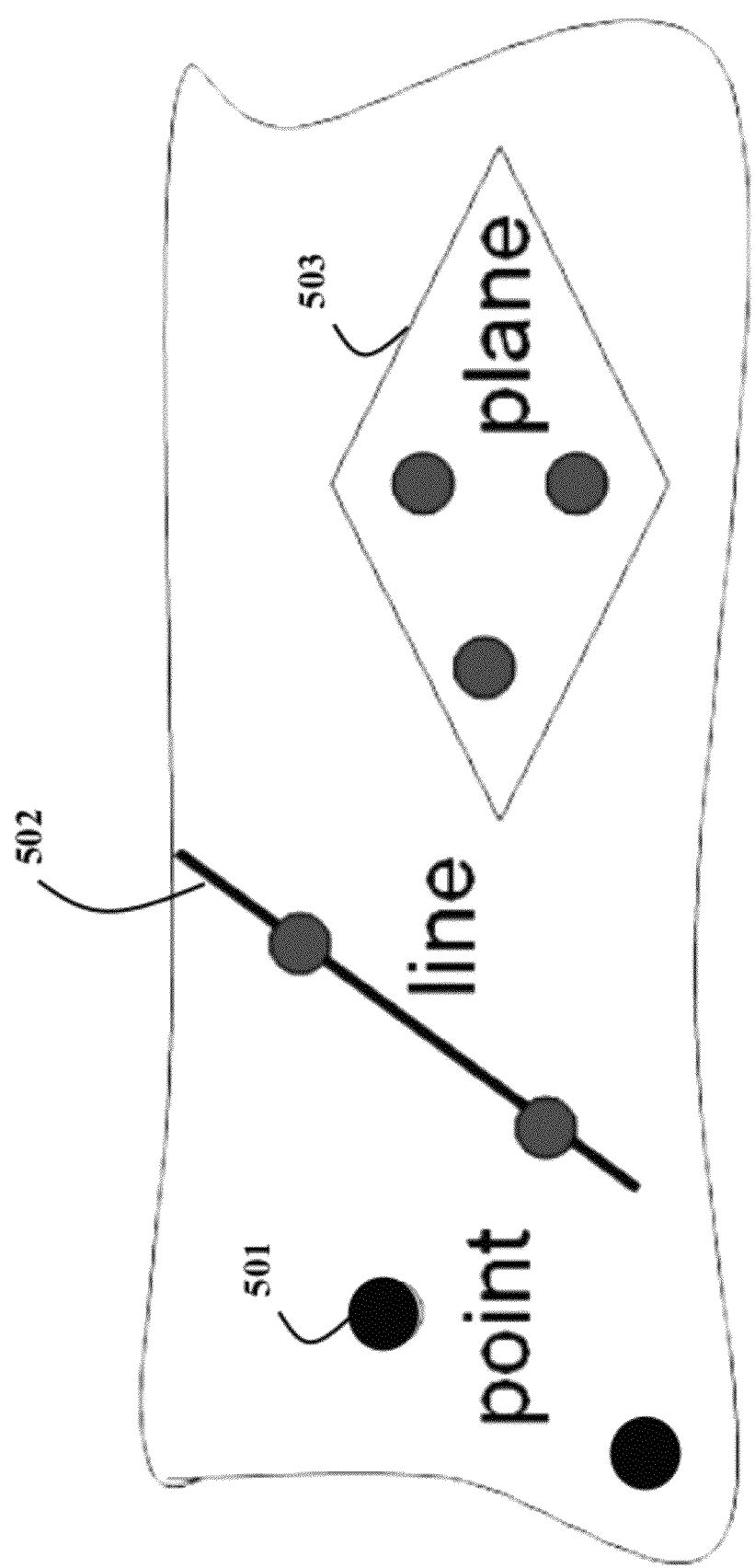
FIG. 5A is a schematic of points, lines and planes transformed by the pose estimation according to embodiments of the invention.
Figure 5B:
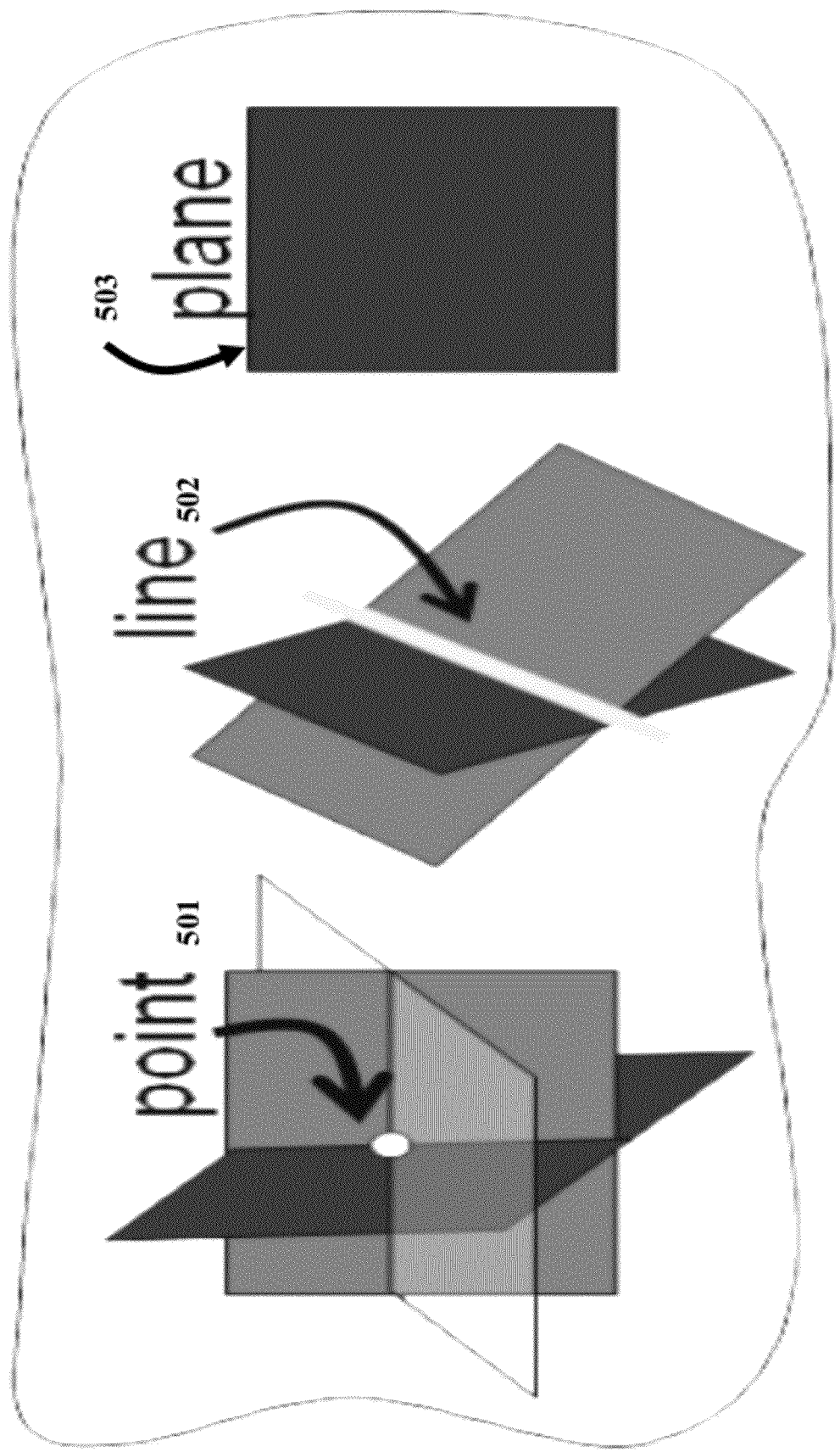
FIG. 5B is a schematic of the transformations for the geometric entities of FIG. 5A to a point-plane registration procedure according to embodiments of the invention.

FIG. 5A shows points 501, lines 502 and planes 503 transformed by the pose estimation according to embodiments of the invention; and FIG. 5B is a schematic of the transformations for the geometric entities 501-503 of FIG. 5A to a point-plane registration procedure according to embodiments of the invention.

In the case of generalized pose estimation, we register three 3D points to the corresponding non-parametric projection rays from the cameras to determine the pose of the object with respect to the camera. In the case of 2D-to-3D pose estimation using three lines, this problem is a registration of three interpretation planes (each formed by two projection rays corresponding to a single line) on three lines.

In the case of 3D-to-3D line-to-plane registration, we register lines from the sensor data to planes from the object. In the case of 3D-to-3D point-to-point registration, we register points from sensor data to points in the object. We can also use a mixture of geometrical entities and thereby we have more than 20 2D-to-3D and 3D-to-3D registration scenarios.

It is possible to convert any of these pose estimation problem involving the three geometric entities to a point-plane registration problem. As shown in FIG. 5A, we transform all geometric entities to points in the sensor data. A point is preserved as a point. In the case of lines and planes, we sample two and three arbitrary points, respectively. The transformation in the object data is shown in FIG. 5B. We transform all geometric entities to planes. A plane is preserved as a plane. Points and lines are parameterized using 3-plane and 2-plane representations respectively.

Degenerate Configurations

Degeneracies can occur based on the geometry of the planes. For a configuration with three planes, if the rank of a 3×3 matrix of all three normals is less than a rank of 3, then we have a degenerate configuration. For example, if there are three planes wherein two planes are parallel, then we have a degenerate configuration.

Correspondence Determination

Figure 3:
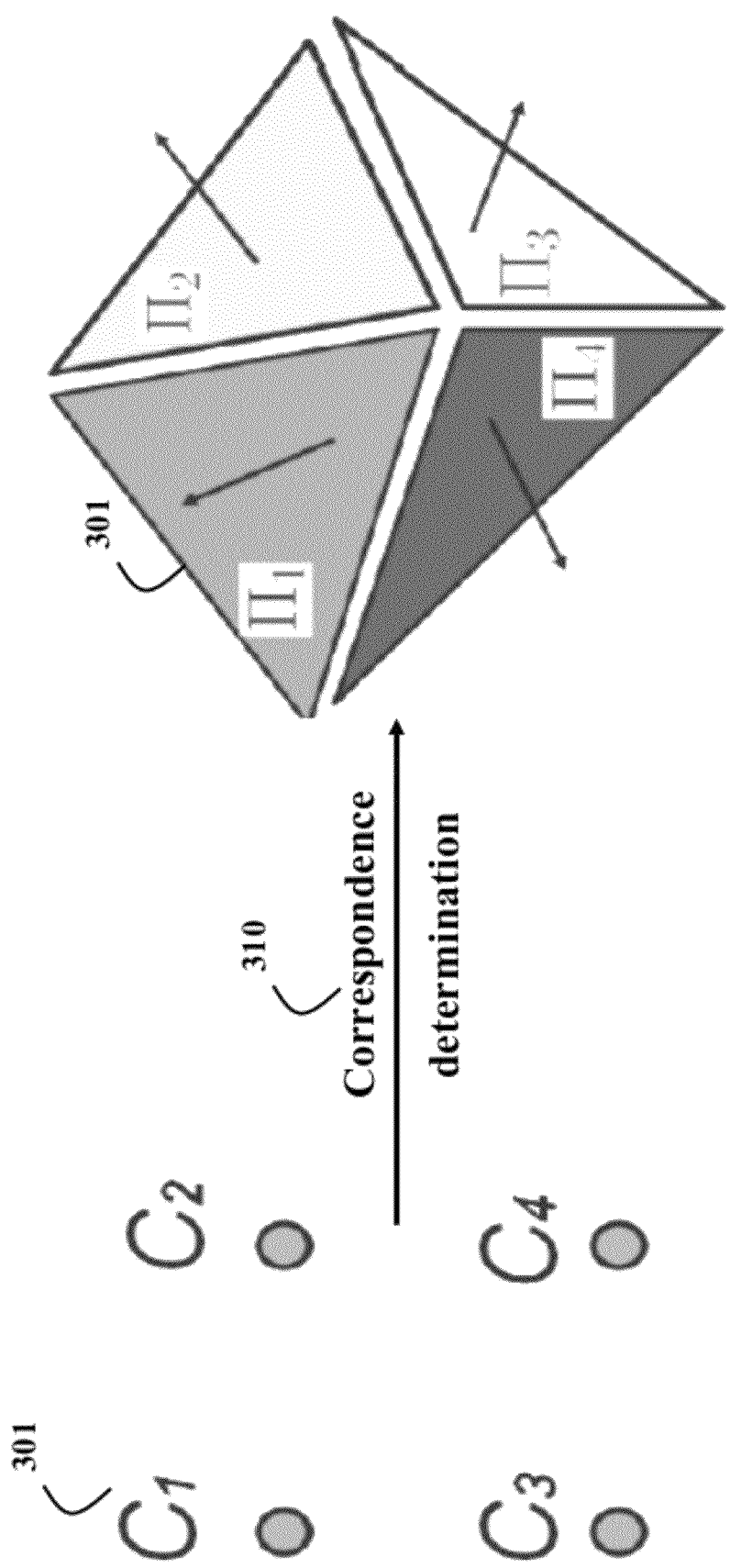
FIGS. 3 and 4 are schematics of a correspondence problem solved by the registration method according to embodiments of the invention.
Figure 4:
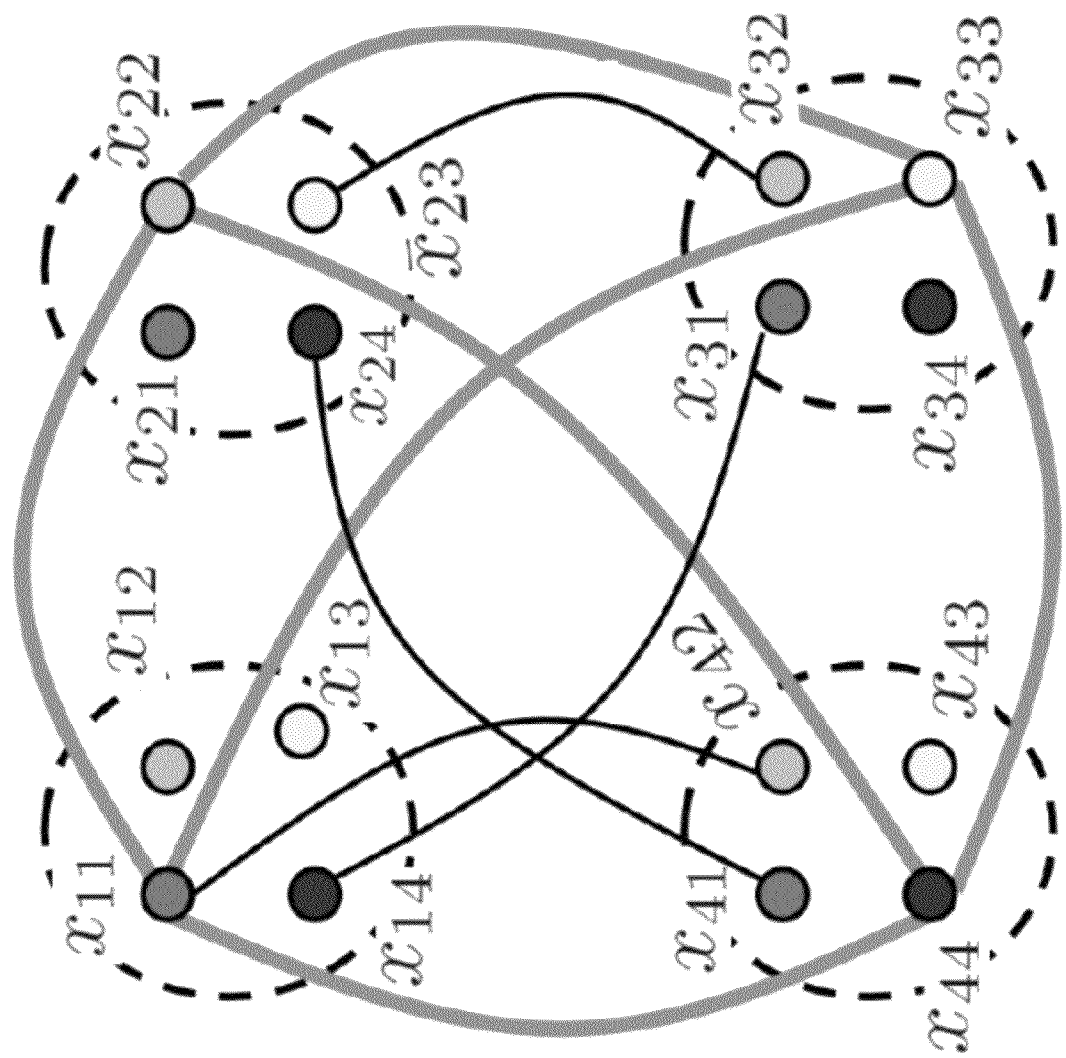

As shown in FIGS. 3 and 4, we determine feasible mappings between the 3D points in the sensor coordinate system, and the planes of the object in the world coordinate system to determine 310 the correspondences. We assume that most, or all of the points in the sensor coordinate system are on the 3D object.

First, we cluster the points from the sensor into several planes. We denote each cluster with a node $C_i$ 301. A node can be a single point. As shown in FIG. 3, our goal is to map these nodes to the corresponding planes $\Pi_i$ 302 of the object.

To do this, we construct a graph as shown in FIG. 4. Every node $x_{ij}$ in this graph represents a mapping between a node $C_i$, and the plane $\Pi_j$. An edge between $x_{ij}$ and $x_{kl}$ is referred to as a consistency edge that signifies that both these mappings can occur simultaneously known constraints.

These constraints are simple geometric constraints enforcing angles between the normals, pairwise distances, etc. The correct correspondence between points and planes can be obtained by finding a maximum clique in the graph. The maximum clique implies that all possible pairwise consistencies are satisfied.

Several procedures can used to solve these NP-hard problems. Because we use minimal approaches for our applications, we are not interested in the correspondences for all the points in the registration problem. We are interested in a small number of point-plane correspondences sufficient to resolve issues from degeneracies and outliers. Thus, we used a simple tree based search for finding the maximum cliques.

EFFECT OF THE INVENTION

The point-plane registration method described herein can be applied to a number of applications, including robotics, determiner vision, augmented reality, and geo-localization. Because the 3D (laser) sensors cannot distinguish boundaries of objects in the same way as 2D (camera) sensors, any method that can work only with points on surfaces, rather than boundaries is useful in numerous applications.

In the geo-localization application, the method can correct the drift problem that usually occurs while using point and line tracking. It is easier to obtain the point-plane correspondences in comparison to point-point and line-line correspondences in textureless 3D models.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

APPENDIX

| n | $(a_1, a_2, \ldots, a_n)$ | Assignment | # of Solutions |
|---|---|---|---|
| <3 | $\Sigma$ | — | degenerate |
| 11 | $\Sigma a_i < 6$ | — | degenerate |
| 3 | (3, 3, 3) | $\pi_1 \Leftarrow \{P_1, P_2, P_3\}$<br>$\pi_2 \Leftarrow \{P_4, P_5, P_6\}$<br>$\pi_3 \Leftarrow \{P_7, P_8, P_9\}$ | 2 (2) |
| 3 | (3, 3, 2) | $\pi_1 \Leftarrow \{P_1, P_2, P_3\}$<br>$\pi_2 \Leftarrow \{P_4, P_5, P_6\}$<br>$\pi_3 \Leftarrow \{P_7, P_8\}$ | 2 (2) |
| 3 | (3, 3, 1) | $\pi_1 \Leftarrow \{P_1, P_2, P_3\}$<br>$\pi_2 \Leftarrow \{P_4, P_5, P_6\}$<br>$\pi_3 \Leftarrow \{P_7\}$ | 2 (2) |
| 3 | (3, 2, 2) | $\pi_1 \Leftarrow \{P_1, P_2, P_3\}$<br>$\pi_2 \Leftarrow \{P_4, P_5\}$<br>$\pi_3 \Leftarrow \{P_6, P_7\}$ | 2 (2) |
| 3 | (4, 1, 1) | — | degenerate |
| 3 | (3, 2, 1) | $\pi_1 \Leftarrow \{P_1, P_2, P_3\}$<br>$\pi_2 \Leftarrow \{P_4, P_5\}$<br>$\pi_3 \Leftarrow \{P_6\}$ | 4 (4) |
| 3 | (2, 2, 2) | $\pi_1 \Leftarrow \{P_5, P_6\}$<br>$\pi_2 \Leftarrow \{P_3, P_4\}$<br>$\pi_3 \Leftarrow \{P_1, P_2\}$ | 8 (4.4) |
| 4 | (3, 1, 1, 1) | $\pi_1 \Leftarrow \{P_1, P_2, P_3\}$<br>$\pi_2 \Leftarrow \{P_4\}$<br>$\pi_3 \Leftarrow \{P_5\}$<br>$\pi_3 \Leftarrow \{P_6\}$ | 4 (2.8) |
| 4 | (2, 2, 1, 1) | $\pi_1 \Leftarrow \{P_5, P_6\}$<br>$\pi_2 \Leftarrow \{P_3, P_4\}$<br>$\pi_3 \Leftarrow \{P_2\}$<br>$\pi_4 \Leftarrow \{P_1\}$ | 8 (3.6) |
| 5 | (2, 1, 1, 1, 1) | $\pi_1 \Leftarrow \{P_5, P_6\}$<br>$\pi_2 \Leftarrow \{P_4\}$<br>$\pi_3 \Leftarrow \{P_3\}$<br>$\pi_4 \Leftarrow \{P_2\}$<br>$\pi_5 \Leftarrow \{P_1\}$ | 16 (5.8) |
| 6 | (1, 1, 1, 1, 1, 1) | $\pi_1 \Leftarrow \{P_6\}$<br>$\pi_2 \Leftarrow \{P_5\}$<br>$\pi_3 \Leftarrow \{P_4\}$<br>$\pi_4 \Leftarrow \{P_3\}$<br>$\pi_5 \Leftarrow \{P_2\}$<br>$\pi_6 \Leftarrow \{P_1\}$ | 16 (5.8) |

We claim:

1. A method for registering points with planes, wherein the points and planes are three-dimensional and associated with an object, wherein the points are acquired by a sensor and represented in a sensor coordinate system and the planes are provided by a 3D model of the object in a world coordinate system, comprising the steps of:
   determining correspondences between the points and the planes;
   transforming, using the correspondences and transformation parameters, the points from the sensor coordinate system to an intermediate sensor coordinate system using sensor rotation and translation parameters ($R_s$, $T_s$) such that three points ($P_1$, $P_2$, $P_3$) are respectively at an origin, at an X axis and in an XY plane of the intermediate sensor coordinate system;
   transforming, using the correspondences, the planes to an intermediate world coordinate system using world rotation and translation parameters ($R_w$, $T_w$), such that a plane $\Pi_1$ is in an XY plane, and a plane $\Pi_2$ intersects an X axis of the intermediate world coordinate system;
   determining intermediate rotation and translation parameters (R, T) by applying coplanarity constraints and orthogonality constraints to the points in the intermediate sensor coordinate system and the planes in the intermediate world coordinate system; and
   determining rotation and translation parameters ($R_{s2w}$, $T_{s2w}$) between the sensor and world coordinate systems using ($R_s$, $T_s$), ($R_w$, $T_w$), and (R, T) to register the points with the planes, wherein the steps are performed in a processor.

2. The method of claim 1, wherein the intermediate rotation and translation parameters are selected to reduce a complexity of polynomial equations for other pose estimation problems.

3. The method of claim 1, wherein the sensor is a laser scanner, an ultra sound scanner, a stereo camera, or a force sensor.

4. The method of claim 1, wherein the object is a building.

5. The method of claim 1, wherein any 2D-3D or 3D-3D registration process involving the three geometrical entities (points, lines and planes) is mapped to a point-plane registration process.

* * * * *